(12) United States Patent
Hands et al.

(10) Patent No.: US 8,713,004 B1
(45) Date of Patent: Apr. 29, 2014

(54) METHOD AND SYSTEM FOR PRIORITIZING POINTS OF INTEREST FOR DISPLAY IN A MAP USING CATEGORY SCORE

(75) Inventors: Brent Alexander Hands, Seattle, WA (US); Nicholas John Lee, Bothell, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/219,535

(22) Filed: Aug. 26, 2011

(51) Int. Cl.
*G06F 7/00* (2006.01)
*G06F 17/30* (2006.01)

(52) U.S. Cl.
USPC .......................... 707/727; 707/724; 707/725

(58) Field of Classification Search
USPC .......... 707/724, 725, 727, 740, 752, 706, 710
See application file for complete search history.

(56) References Cited

U.S. PATENT DOCUMENTS

| | | | |
|---|---|---|---|
| 2003/0036848 A1* | 2/2003 | Sheha et al. | 701/209 |
| 2009/0234847 A1* | 9/2009 | Homma et al. | 707/5 |
| 2010/0198917 A1* | 8/2010 | Petersen et al. | 709/204 |
| 2012/0143859 A1* | 6/2012 | Lymperopoulos et al. | 707/724 |
| 2012/0209861 A1* | 8/2012 | Narasimha et al. | 707/750 |

* cited by examiner

*Primary Examiner* — Mariela Reyes
*Assistant Examiner* — Hexing Liu
(74) *Attorney, Agent, or Firm* — McDermott Will & Emery LLP (57) ABSTRACT

Systems, methods, and machine-readable media for prioritizing points of interest for display in a map based on the categories associated with each of the points of interest have been described. In certain aspects, the system may include a logging module, a category module, and a ranking module. The logging module may be configured to obtain a plurality of user interactions associated with a one or more categories. The category module may be configured to increment a category count for each category associated with the user interaction for each user interaction of the plurality of user interactions and calculate a category score for the each category of one or more categories based on the category count for each category of the one or more categories. The ranking module may be configured to calculate a priority score for each of the points of interest based on category scores for the one or more categories associated with each of the points of interest.

11 Claims, 5 Drawing Sheets

POI Listing

| Unique ID |
|---|
| Name |
| Location |
| Categories |
| ... |

METHOD AND SYSTEM FOR PRIORITIZING POINTS OF INTEREST FOR DISPLAY IN A MAP USING CATEGORY SCORE

BACKGROUND

The present disclosure generally relates to location based services and, in particular, to the display of point of interest (POI) listings in a mapping interface.

POI listings may be displayed on a mapping interface in order to help a user to identify a POI or to find directions to a POI. For example a mapping interface may display POI listings in order to help a user visualize a route from one location to another. In another scenario, a user may use online search services to find POIs near a certain location. These POIs may be displayed in a map interface to help a user identify or visualize the POIs' location.

In some cases, it may be useful to show a number of POIs on a map. However, in some cases, not all POIs in a map interface may be effectively shown at the same time.

SUMMARY

According to one aspect of the subject technology, a system for prioritizing points of interest for display in a map is provided. The system may include a logging module, a category module, and a ranking module. The logging module may be configured to obtain a plurality of user interactions associated with a one or more categories. The category module may be configured to increment a category count for each category associated with the user interaction for each user interaction of the plurality of user interactions and calculate a category score for the each category of one or more categories based on the category count for each category of the one or more categories. The ranking module may be configured to calculate a priority score for the POI listing based on category scores for the one or more categories associated with the POI listing.

According to another aspect of the subject technology, a method for prioritizing points of interest for display in a map is provided. The method may include detecting a plurality of user interactions associated with one or more categories in a set of categories and, for each category in the set of categories, calculating a number of user interactions associated with the category and determining a category score for the category based on the number of user interactions associated with the category. The method may further include prioritizing, using a processor, the listing for display in the map based on the category scores for the one or more categories associated with the listing.

According to yet another aspect of the subject technology, a machine-readable medium including instructions stored therein, which when executed by a machine, cause the machine to perform operations for prioritizing points of interest for display in a map is provided. The operations may include obtaining a set of POI listings, each POI listing of the set of POI listings associated with one or more categories, calculating a category score for each category of the one or more categories based on a number of user interactions for each category, and prioritizing each POI listing for display on a map based on the category score of each category associated with the POI listing.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In accordance with various aspects of the subject technology, systems and methods for prioritizing point of interest (POI) listings for display in a map are disclosed. By prioritizing POI listings to be displayed on a map, a mapping service may display the most useful POI listings while hiding others. As a result, the map may be less cluttered and improve readability. Many factors or signals may be used to prioritize POI listings for display in a map. For example, the location of a POI, the distance of the POI to a reference location, review ratings, and the web presence of the POI may all be considered in prioritizing a POI listing.

In some cases, it may be helpful to prioritize POI listings for display in a map based on one or more categories that the POI listings belong to. For example, listings associated with one category (e.g., restaurants) may be more popular or useful to a user than listings associated with another category (e.g., fire stations) depending on the situation. According to various aspects of the subject technology, a mapping system may be configured to prioritize the display of listings belonging to more useful categories over listings belonging to less useful categories.

According to other aspects, the mapping system may also be able to determine which categories are more useful to users by monitoring user interactions on a mapping interface and identifying which categories are more popular to users based on the user interactions. A user interaction may be any signal received from a user or user device that is associated with a POI listing. For example, a user interaction may include a selection of a POI listing on a mapping interface or a selection of a POI listing on search result interface.

Usefulness or popularity of a category may be represented by a category score that is calculated based on the number of user interactions detected that are associated with a particular category. For example, a category associated with 1,000,000 user interactions detected in the span of a day may be more popular than a category associated with 200 user interactions in that same time period. In one aspect, however, the mapping system may also consider the size of the categories. For example, a category with 1,000 listings will most likely have more user interactions than another category with only 5 listings, even if the 5 listings were more popular on average than the 1,000 listings. As a result, the category score may be calculated based on the average number of user interactions per listing in a particular category, detected during a given time period.

Figure 1:
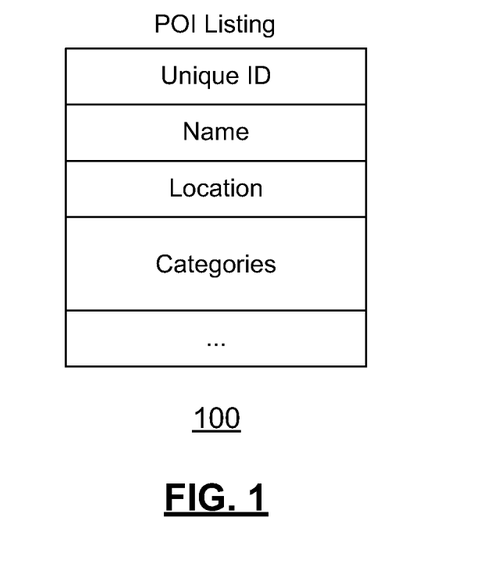
FIG. 1 is a conceptual block diagram illustrating a POI listing, in accordance with one aspect of the subject technology.

A point of interest (POI) listing (sometimes referred to as simply as a "listing") may be any data structure used to store information about a specific POI (e.g., a business, a park, an airport, an office, a school, etc.). FIG. 1 is a conceptual block diagram illustrating a POI listing 100 in accordance with one aspect of the subject technology. A POI listing 100 may include data about a POI such as the name of the POI, a location of the POI (e.g., longitude and latitude coordinates), a unique identifier for the POI, or other information about the POI.

In one aspect, the POI listing 100 may also include one or more categories that the POI may belong to or be associated with. The categories may represent a characteristic of the POI or a type of POI. Some example categories may include, but are not limited to, "business," "restaurant," "pizza restaurant," "restaurant chain," "shopping center," "retail store," "landmark," "park," "university," or some other category that may be used to group POIs. In another aspect, the categories may be organized into a hierarchical graph in which a category may have one or more parent categories and one or more child categories. For example, the "business" category may have the "restaurant" and "retail store" categories as child categories and the "restaurant" category may have "pizza restaurant" and "restaurant chain" as child categories.

Figure 2:
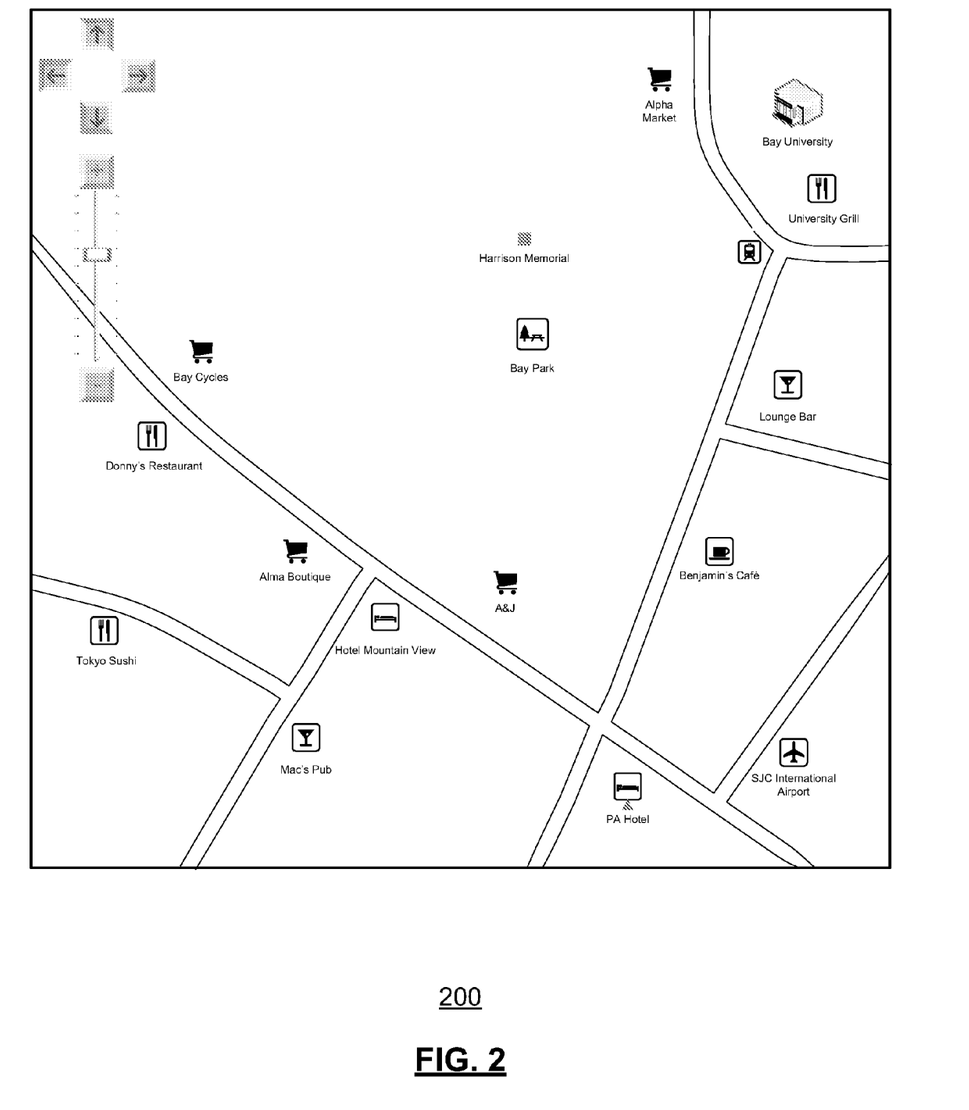
FIG. 2 is a user interface displaying a map, in accordance with one aspect of the subject technology.

FIG. 2 is a user interface 200 (e.g., a mapping interface) displaying a map, in accordance with one aspect of the subject technology. The map in the user interface 200 may be generated by a mapping service and may contain a variety of POI listings. For example, the POI listings displayed in the map may include businesses, government buildings, landmarks, churches, hospitals, neighborhoods, districts, etc. Each POI listing may be identified on the map using an icon, a label, or both.

The user interface 200 may also include controls that enable a user on a client device to control a zoom level of the map or to scroll the map in one or more directions. When a user activates one or more controls on the user interface 200, the mapping service may update the map and the POI listings displayed on the map. For example, if a user activates a scroll control, the map may scroll in a direction to reveal newly displayed portions of the map and new POI listings may be displayed for the entire map or just for the newly displayed portions of the map.

If a user activates a zoom-in control, the area displayed in the map may be viewed from a closer perspective and, according to some aspects, new POI listings previously not shown may be displayed on the map. If, on the other hand, a user activates a zoom-out control, the area displayed in the map may viewed from a wider angle revealing newly displayed portions of the map. Furthermore, according to some aspects, POI listings previously shown may become hidden and new POI listings may be displayed on the newly displayed portions of the map.

Although a number of POI listings are shown in interface 200, many others may be located in the area shown in the map but are hidden from view. The mapping service may determine which listings are shown on the map based on various factors such as, but not limited to, the zoom level, the number of listings located within the area shown in the map, the number of listings located within a portion of the area shown in the map (e.g., how densely populated with listings a portion of the area shown in the map is), user profile information, and search query parameters. In one aspect, the mapping service may also determine which listings are shown on the may based on one or more categories associated with each listing.

Figure 3:
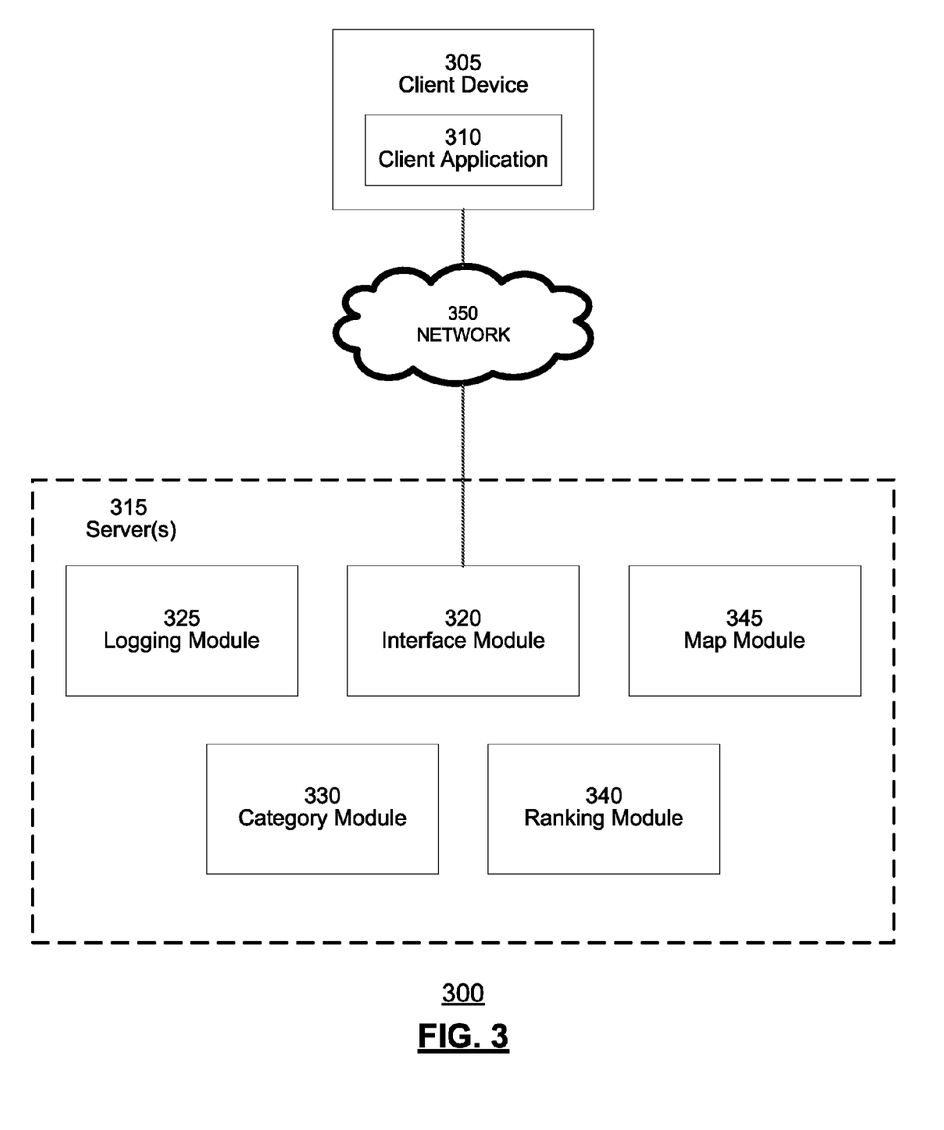
FIG. 3 is a conceptual block diagram illustrating a network environment for prioritizing points of interest for display on a map, in accordance with various aspects of the subject technology.

FIG. 3 is a conceptual block diagram illustrating a network environment 300 for prioritizing points of interest for display on a map, in accordance with various aspects of the subject technology. Although FIG. 3 illustrates a client-server network environment 300, other aspects of the subject technology may include other configurations including, for example, peer-to-peer environments or single system environments. The network environment 300 may include at least one server 315 and at least one client device 305 connected over a network 350. The client device 305 may be any machine configured to generate and transmit a user interaction to the server 315. For example, client device 305 may be a desktop computer, a server, a set top box, a video game console, a thin client, a mobile device (e.g., a phone, tablet, personal digital assistant (PDA), a global positioning system (GPS) device, etc.), or any other machine with a processor, memory, and communications capabilities.

The client device 305 may include one or more client applications 310 configured to generate and transmit user interactions to a server. According to one aspect, web browsers or other applications on the client device 305 may be configured to provide local search capabilities or mapping capabilities. In order to do so, the web browsers or other applications may be configured to receive local search interfaces, local search results, and mapping interfaces, generate various user interactions, and transmit user interactions to one or more servers 315. For example, users of a client device 305 may generate a local search query and receive local search results displayed as POI listings in a mapping interface. The user may select one or more of the POI listings and transmit the user interaction to the server 315.

The network 350 can include, for example, any one or more of a personal area network (PAN), a local area network (LAN), a campus area network (CAN), a metropolitan area network (MAN), a wide area network (WAN), a broadband network (BBN), the Internet, and the like. Further, the network 350 can include, but is not limited to, any one or more of the following network topologies, including a bus network, a star network, a ring network, a mesh network, a star-bus network, tree or hierarchical network, and the like.

The server 315 may be any system or device having a processor, a memory, and communications capability configured to prioritize points of interest for display on a map. In one aspect, a server 315 may be a virtual entity that might refer to a cluster or even multiple clusters of servers. The server 315 may include an interface module 320, a logging module 325, a category module 330, a ranking module 340, and a map module 345. The modules illustrated in FIG. 3 may include software instructions encoded in a medium and executed by a processor, computer hardware components, or a combination of both. For example, the modules may each include one or more processors or memories that are used to perform the functions described below. According to another aspect, the various systems and modules may share one or more processors or memories.

The interface module 320 may be configured to communicate with other systems (e.g., client devices), servers, and other modules. For example, the interface module may receive user interactions from client devices 305. As mentioned above, user interactions may be any type of signal received from a user or client device 305 that is associated with a POI listing. For example, a user interaction may include a selection of a POI listing on a mapping interface or a selection of a POI listing on search result interface. The user interactions received by the interface module 320 may be stored in the logging module 325.

The logging module 325 may be configured to obtain user interactions received from client devices 305 and anonymously log them. These user interactions may be of various types (e.g., selections of POI listings on a mapping interface, selections of POI listings on a search result interface, search queries associated with the POI listing, etc.) received by the interface module 320 from a number of users and client devices 305 via the network 350. In one aspect, in order to conserve computing resources, the logging module 325 may not log every user interaction received by the interface module 320. Instead, the logging module 325 may log a smaller sampling of user interactions for a period of time. The smaller sampling may, in some cases, be a random or near random selection of user interactions.

The logging module 325 may also be configured to determine which categories are associated with each logged user interaction. For example, a user interaction may be associated with a particular POI listing (e.g., the user interaction is a selection of a POI listing on a mapping interface). The logging module 325 may map the user interaction to one or more categories associated with the user interaction by locating the POI listing stored in a database and identifying one or more categories that the POI listing is associated with.

The category module 330 may be configured to monitor a number of categories and calculate the number of user interactions associated with each of the categories. In one aspect, the category module 330 may maintain a counter for each category that is monitored and may increment the counter for one of the categories when the logging module 325 determines that a received user interaction is associated with that category. The category module 330 may also be configured to determine a category score for each category based on the number of interactions associated with the category (e.g., the category's counter value). The category score may be used to represent how popular or how useful a category is.

The ranking module 340 may be configured to prioritize a POI listing for display on a map based on the category scores associated with the POI listing. For example, a priority score may be calculated for the POI listing based on a variety of factors or signals that include the category scores associated with the POI listing. If the POI listing belongs to more than one category, the average category score of all the categories that the POI listing belongs to may be used in the formula to calculate the priority score of the POI listing. In another aspect, the maximum category score of all the categories that the POI listing belongs to may be used in the formula to calculate the priority score of the POI listing.

The map module 345 may be configured to generate a map for display on a client device 305. In generating the map, the map module 345 may identify a number of POI listings that are located within the mapped area and designate one or more POI listings to be displayed on the map. In one aspect, if each POI listing is associated with a priority score generated by the ranking module 340, the map module 345 may designate those POI listings located within the mapped area with a priority score that exceeds a certain threshold may be designated for display. According to another aspect, only a predetermined number of POI listings located within the mapped area that have the highest priority scores for display (e.g., the POI listings with the top 10 or 20 priority scores).

Figure 4:
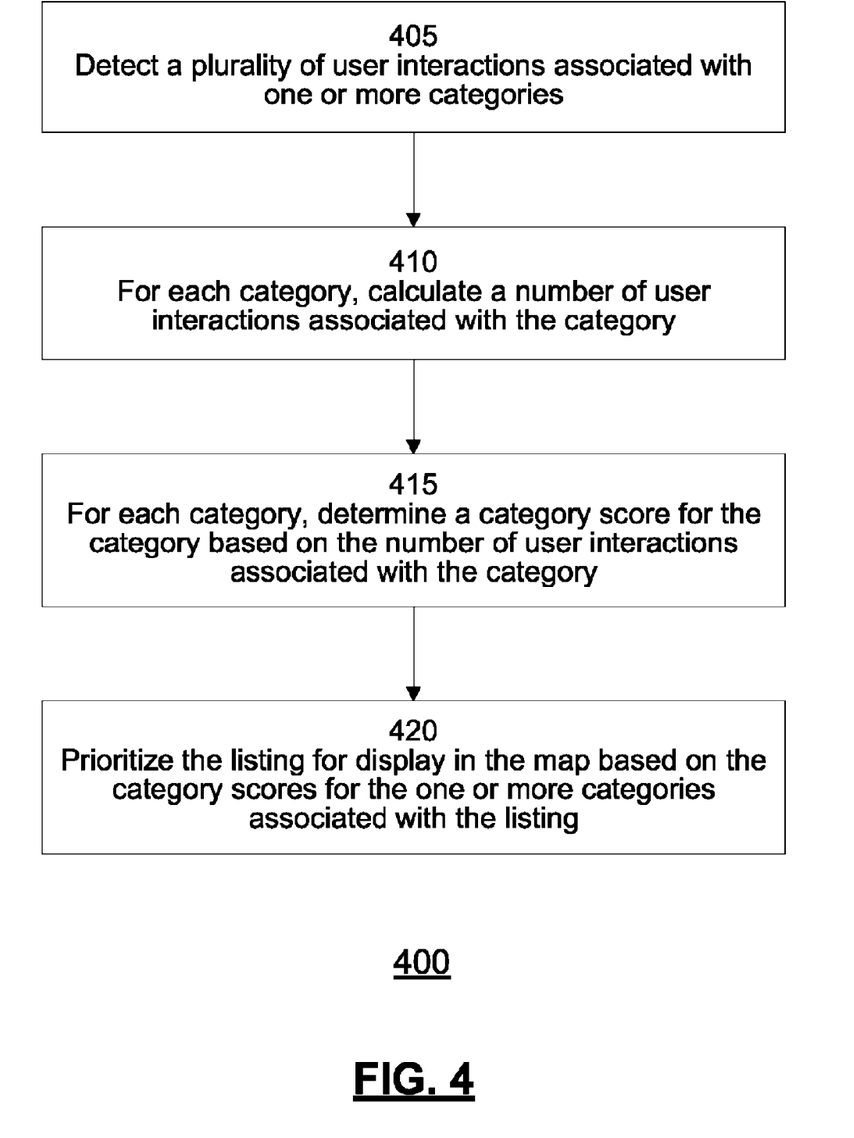
FIG. 4 is a flow chart illustrating a process for prioritizing points of interest for display in a map, in accordance with various aspects of the subject technology.

FIG. 4 is a flow chart illustrating a process 400 for prioritizing points of interest for display in a map, in accordance with various aspects of the subject technology. Although the operations in process 400 are shown in a particular order, certain operations may be performed in different orders or at the same time. The process 400 may begin at operation 405, where the logging module 325 detects user interactions received by the interface module 320 over a period of time. Each user interaction may be associated with a POI listing which is further associated with one or more categories. For example, a user interaction may be a user click or selection of a POI listing in a mapping interface or a search result interface and the POI listing may belong to one or more categories.

At operation 410, the category module 330 may calculate the number of user interactions detected by the logging module 325 for each category. For example, each category tracked by the category module 330 may have a counter that is incremented for each user interaction detected that is associated with that particular category. As mentioned above, each user interaction may be associated with a POI listing that belongs to more than one category. As a result, more than one counter may be incremented for each user interaction detected. The counters for the categories may be incremented as the user interactions are detected or in a batch at the end of a period of time.

In one aspect, the categories monitored by the category module 330 may be organized into a hierarchical graph in which a category may have one or more parent categories and one or more child categories. When a user interaction associated with a category is detected, the count for the category may be incremented as well as the category counts for all parent or other ancestor categories.

The category module 330 may also determine a category score for each category based on the number of user interactions associated with the category at operation 415. The category score may represent how popular a category is to users, as a result, it may be desirable in some cases to factor in the size of a category (e.g., the number of listings that belong to the category). In one aspect, the category score for a category may be calculated based on the average number of user interactions for a listing in that category. The average number of user interactions detected for listings in that category may be determined by dividing the total number of user interactions associated with the category (e.g., the count for the category) by the total number of listings in that category.

In an illustrative scenario, a particular geographic area may have 100 listings that are associated with a "hotel" category. Over a specific period of time, a two week period for example, 1500 user interaction associated with those 100 listings may have been received and logged by the system. As a result, the average number of user interactions detected for the listings in the "hotel" category may be 15 per listing. In one aspect, the category score may simply be this average number of interactions per listing in the category value. In another aspect, however, the category module 330 may convert this average number into another format (e.g., a value between 0 and 1) so that the converted number may be used to determine the priority score of a listing.

According to another aspect, the category module 330 may cap the category score of certain categories that are determined to have low display importance (e.g., not be useful to a user if it is displayed on a map). For example, the category module 330 may determine that a particular category (e.g., a "fire station" or a "hotel" category) has low display importance even if the category receives a large number of user interactions. Instead of calculating the category score in the typical manner, the category module 330 may cap the category score of that category if it exceeds a predetermined threshold. For example, taking the illustrative scenario discussed above, the category score for the "hotel" category would have been 15. However, if the "hotel" category was identified as a category of low display importance and if a predetermined threshold for categories of low display importance is set at 5, the category module may cap the category score at 5 because the category score for "hotel" would have exceeded the predetermined threshold of 5.

At operation 420, the ranking module 340 may prioritize one or more POI listings for display on a map based on the category scores of the categories the listing is associated with. If the POI listing belongs to more than one category, the average category score of all the categories that the POI listing belongs to may be used in the formula to calculate the priority score of the POI listing. In another aspect, the maximum category score of all the categories that the POI listing belongs to may be used in the formula to calculate the priority score of the POI listing.

According to one aspect, the ranking module 340 may calculate the priority score by using a formula that assigns various weights to various factors or signals. One example formula may be in the format provided below:

$$\text{Priority Score} = (w1 \cdot f1) + (w2 \cdot f2) + (w3 \cdot f3) \ldots$$

where f1, f2, and f3 are factors (e.g., average category score, location of a POI, review ratings, the web presence, etc.) and w1, w2, and w3 are weights assigned to the factors. In another aspect, the category scores may be first converted into a number between 0 and 1 before they are used in the formula to calculate the priority score.

The map module 345 may use the priority scores of the POI listings to designate one or more POI listings to be displayed on the map. For example, the map module 345 may generate a map to transmit to a client device 305. In generating the map, the map module 345 may identify a set of POI listings from a database. The set of POI listings may include all listings that are located within the area to be displayed on the map or a subset of all the listings. The map module may then designate which listings in the set of listings to display on the map. In one aspect of the subject technology, the map module 345 may designate a predetermined number of POI listings with the highest priority scores for display (e.g., the 20 POI listings with the highest priority scores). According to another aspect, the map module 345 may designate a POI listing for display in the map if the priority score of the POI listing exceeds a predetermined threshold.

According to another aspect of the subject technology, the user interaction data may be normalized first before determining the category score so that the category score is not affected too much by a small sample data set. For example, the number of listings for a category may be adjusted by adding a predetermined number of listings. The click count for the category may also be adjusted by adding the number of click counts expected for the predetermined number of listings across all categories. The category score for each category may then be calculated based on the adjusted click count divided by the adjusted number of listings for the category. In this way, categories with fewer listings or with fewer or no recorded user interactions (e.g., clicks) will not be punished too harshly.

In one illustrative scenario, a "restaurant" category may have a million listings in a geographic area while a smaller category such as "city hall" might only have 5 listings in the same geographic area. If only a small portion of user interactions are logged and used to determine the category score, it is more likely that the "city hall" category may be more greatly affected by variations in the sample data set. These variations may be stabilized by injecting average data into the data set. For example, 100 listings may be added to every category such that the "restaurant" category will have 1,000,100 listings and the "city hall" category will have 105 listings. If the average number of user interactions for a listing of any category is 1.5 per listing, the expected number of user interactions for the 100 listings added would be 150 user interactions. Therefore the number of user interactions associated with the "restaurant" category and the "city hall" category would each be increased by 150. The result of this injecting of average data into the data set would not affect the "restaurant" category a great deal based on the size of the category. However, the injection of the average data would insulate the "city hall" category from variations in the sample data set.

According to one aspect, the user interaction data and category data being monitored in one market (e.g., a particular geographical area) may be distinguished from user interaction data and category data from another market. As a result, categories in different markets may have different category scores.

Figure 5:
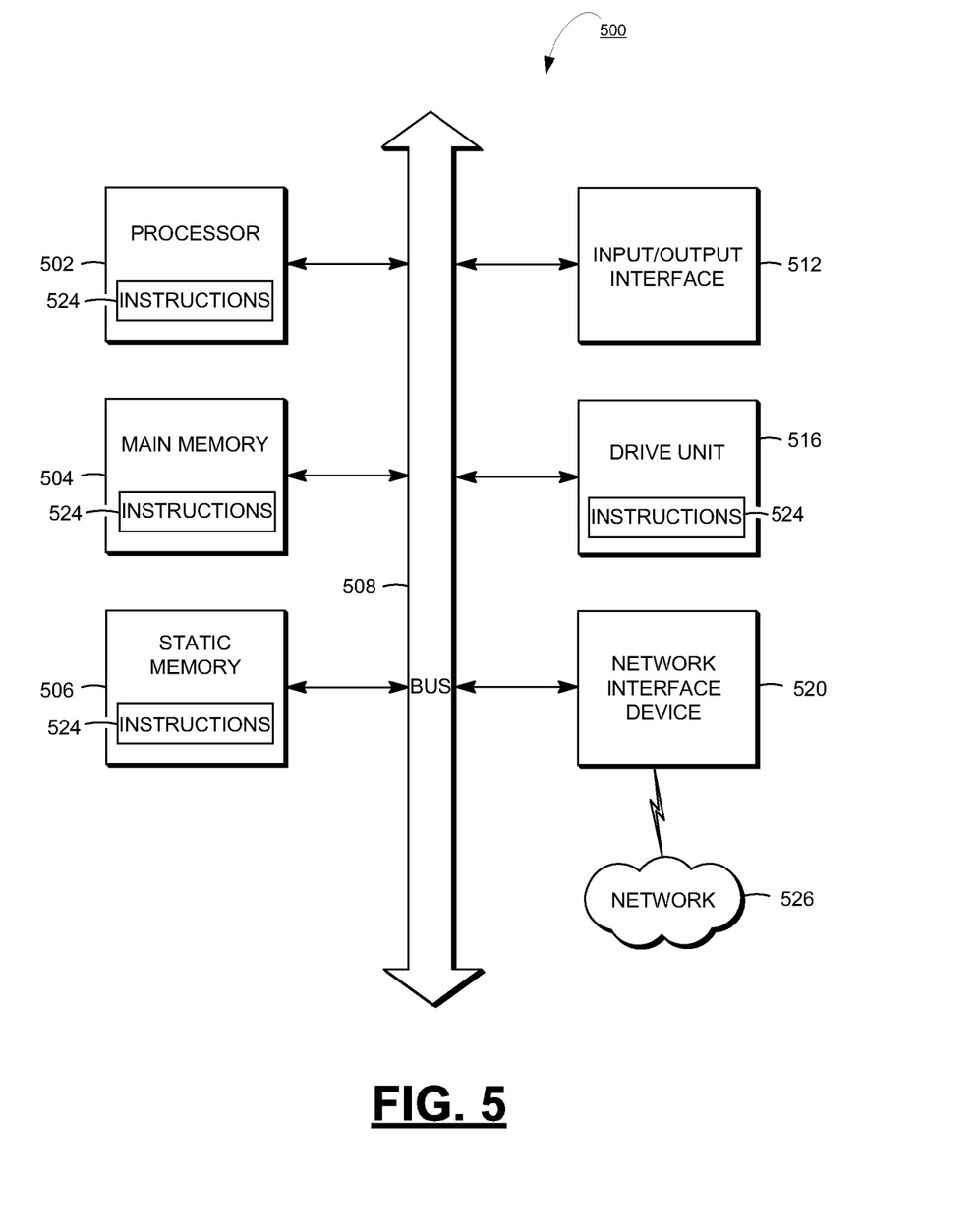
FIG. 5 is a conceptual block diagram illustrating a computer system with which each of the clients and servers of FIG. 1 may be implemented.

FIG. 5 is a block diagram illustrating a computer system with which any of the clients and servers of FIG. 1 may be implemented. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for prioritizing points of interest for display in a map have been described. According to various aspects of the subject technology, a mapping system may be configured to prioritize the display of listings belonging to more useful categories over listings belonging to less useful categories. According to other aspects, the mapping system may also be able to determine which categories are more useful to users by monitoring user interactions on a mapping interface and identifying which categories are more popular to users based on the user interactions. A user interaction may be any signal received from a user or user device that is associated with a POI listing. For example, a user interaction may include a selection of a POI listing on a mapping interface or a selection of a POI listing on search result interface.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for prioritizing points of interest for display in a map, wherein the points of interest are associated with one or more categories, the method comprising:
    detecting a plurality of user selections of at least one point of interest associated with one or more categories in a set of categories;
    for each category in the set of categories:
        calculating a number of user selections associated with the category,
        determining a number of points of interest associated with the category,
        calculating an adjusted number of points of interest associated with the category by adding a predetermined number of points of interest to the number of points of interest associated with the category;
        determining an expected number of user selections for the predetermined number of points of interest;

calculating an adjusted number of selections associated with the category by adding the expected number of user selections to the number of user selections associated with the category;

determining a category score for the category based on the adjusted number of points of interest associated with the category and the adjusted number of user selections associated with the category; and calculating a priority score for each point of interest in the at least one point of interest based on a plurality of factors, the plurality of factors including an average category score for the one or more categories associated with the point of interest;

prioritizing, using a processor, the at least one point of interest for display in the map based on the priority score for each point of interest.

2. The method of claim 1, wherein each user interaction of the plurality of user selections is associated with a particular point of interest, and wherein calculating a number of user selections associated with the category comprises:

for each user interaction of the plurality of user selections associated with the particular point of interest:
identifying a category associated with the particular point of interest, and
incrementing a category count for the category associated with the particular point of interest.

3. The method of claim 1, wherein prioritizing the points of interest for display in the map based on the category scores for the one or more categories associated with each of the points of interest comprises:

calculating an average category score for each point of interest based on the category scores for the one or more categories associated with the point of interest;
prioritizing each point of interest for display in the map based on the average category core for the point of interest.

4. The method of claim 1, wherein the set of categories belong to a hierarchical graph of categories.

5. The method of claim 1, further comprising:
identifying a category designated as a low display importance category;
determining if the category score of the category with the low display importance exceeds a predetermined threshold; and
setting the category score of the category with the low display importance to the predetermined threshold if the category score of the category with the low display importance exceeds the predetermined threshold.

6. The method of claim 1, wherein the plurality of user selections are user interactions selections associated with a single geographical area.

7. The method of claim 1, wherein the plurality of user selections are collected at random over a predetermined period of time.

8. A system for prioritizing a points of interest for display in a map, wherein the points of interest are associated with one or more categories, the system comprising:
one or more processors; and
a non-transitory machine-readable storage medium encoded with instructions executable by the one or more processors, the instructions comprising:
a logging module configured to obtain a plurality of user selections of points of interest associated with a one or more categories in a set of categories;

a category module configured to:
for each user interaction of the plurality of user selections, increment a category count for each category associated with the user interaction, and
for each category in the set of categories:
calculate a number of user selections associated with the category,
determine a number of points of interest associated with the category,
calculate an adjusted number of points of interest associated with the category by adding a predetermined number of points of interest to the number of points of interest associated with the category;
determine an expected number of user selections for the predetermined number of points of interest;
calculate an adjusted number of selections associated with the category by adding the expected number of user selections to the number of user selections associated with the category;
determine a category score for the category based on the adjusted number of points of interest associated with the category and the adjusted number of user selections associated with the category; and
calculate a priority score for each point of interest in the at least one point of interest based on a plurality of factors, the plurality of factors including an average category score for the one or more categories associated with the point of interest;
a ranking module configured to calculate a priority score for each of the points of interest.

9. The system of claim 8, further comprising:
a mapping module to designate points of interest to be displayed on the map based on the priority score of each of the points of interest.

10. The system of claim 8, wherein the category module is configured to:
identify a category designated as a low display importance category;
determine if the category score of the category with the low display importance exceeds a predetermined threshold; and
set the category score of the category with the low display importance to the predetermined threshold if the category score of the category with the low display importance exceeds the predetermined threshold.

11. A non-transitory machine-readable medium comprising instructions stored therein, which when executed by a machine, cause the machine to perform operations comprising:
obtaining a set of points of interest (POI) listings, each POI listing of the set of POI listings associated with one or more categories;
for each category in the one or more categories:
calculating a number of user selections of points of interest associated with the category,
determining a number of POI listings associated with the category,
calculating an adjusted number of POI associated with the category by adding a predetermined number of POI to the number of POI associated with the category;
determining an expected number of user selections for the predetermined number of POI;

calculating an adjusted number of selections associated with the category by adding the expected number of user selections to the number of user selections associated with the category;

determining a category score for the category based on the adjusted number of POI associated with the category and the adjusted number of user selections associated with the category; and calculating a priority score for each POI in the at least one POI based on a plurality of factors, the plurality of factors including an average category score for the one or more categories associated with the POI;

prioritizing each POI listing for display on a map based on the priority score for each POI.

* * * * *